US012418869B2

(12) United States Patent
Fleischhacker et al.

(10) Patent No.: US 12,418,869 B2
(45) Date of Patent: Sep. 16, 2025

(54) COMMUNICATION DEVICE AND OPERATING METHOD

(71) Applicant: NXP B.V., Eindhoven (NL)

(72) Inventors: Jens Fleischhacker, Hamburg (DE); Hermanus Johannes Effing, Overasselt (NL)

(73) Assignee: NXP B.V., Eindhoven (NL)

( * ) Notice: Subject to any disclaimer, the term of this patent is extended or adjusted under 35 U.S.C. 154(b) by 365 days.

(21) Appl. No.: 18/065,806

(22) Filed: Dec. 14, 2022

(65) Prior Publication Data

US 2023/0239006 A1  Jul. 27, 2023

(30) Foreign Application Priority Data

Jan. 10, 2022  (EP) .................................. 22150652

(51) Int. Cl.
*H04B 5/72* (2024.01)
*H04W 56/00* (2009.01)

(52) U.S. Cl.
CPC .............. *H04B 5/72* (2024.01); *H04W 56/00* (2013.01)

(58) Field of Classification Search
CPC ... H04B 5/72; H04B 5/48; H04B 5/77; H04B 5/24; H04B 5/45; H04B 17/318; H04B 5/70; H04W 56/00
USPC ...................................................... 455/41.1
See application file for complete search history.

(56) References Cited

U.S. PATENT DOCUMENTS

| 2006/0022803 | A1* | 2/2006 | Akiyama ........... G06K 19/0723 455/39 |
| 2007/0190952 | A1* | 8/2007 | Waheed ................ H03F 1/3241 455/114.3 |
| 2014/0126461 | A1* | 5/2014 | Ghosh ................... H04W 16/26 370/336 |
| 2014/0370803 | A1 | 12/2014 | Haverinen et al. |
| 2015/0340876 | A1* | 11/2015 | Walley .................... H02J 50/12 307/104 |
| 2020/0229091 | A1 | 7/2020 | Wobak et al. |
| 2022/0345863 | A1* | 10/2022 | Mueck .................... H04W 4/50 |

FOREIGN PATENT DOCUMENTS

CN  111046687 A  4/2020

* cited by examiner

*Primary Examiner* — Eugene Yun

(57) ABSTRACT

In accordance with a first aspect of the present disclosure, a communication device is provided, comprising: a transmitter configured to transmit one or more radio frequency signal pulses; a detection unit configured to detect one or more load changes at a radio frequency interface occurring in response to the radio frequency signal pulses transmitted by the transmitter, wherein said load changes are indicative of the presence of an external communication device; a first clock generator comprising a free-running oscillator, wherein said first clock generator is configured to provide a clock signal to the transmitter and the detection unit while said transmitter transmits said radio frequency signal pulses and the detection unit detects said load changes. In accordance with a second aspect of the present disclosure, a corresponding method of operating a communication device is conceived.

20 Claims, 7 Drawing Sheets

COMMUNICATION DEVICE AND OPERATING METHOD

CROSS-REFERENCE TO RELATED APPLICATIONS

This application claims the priority under 35 U.S.C. § 119 of European Patent application no. 22150652.0, filed on 10 Jan. 2022, the contents of which are incorporated by reference herein.

TECHNICAL FIELD

The present disclosure relates to a communication device. Furthermore, the present disclosure relates to a corresponding method of operating a communication device.

BACKGROUND

Radio frequency (RF) communication devices are widely used. Examples of RF communication devices are near field communication (NFC) devices and radio frequency identification (RFID) devices. Typically, an NFC system or an RFID system includes a reader device—sometimes referred to as a reader, an interrogator or a proximity coupling device (PCD)—which generates a high-frequency radio field, and a passive or active communication counterpart. The communication counterpart may be a passive transponder or an active card emulation device, for example, which may be referred to as a proximity integrated circuit card (PICC). The reader device emits a radio frequency field that may power the communication counterpart. Modulation schemes and signal coding are applied for the communication between the devices. Specific implementation examples are described, inter alia, in the technical standards issued by the NFC Forum, and in the technical standards ISO/IEC 14443, ISO/IEC 15693, ISO/IEC 18092.

SUMMARY

In accordance with a first aspect of the present disclosure, a communication device is provided, comprising: a transmitter configured to transmit one or more radio frequency signal pulses; a detection unit configured to detect one or more load changes at a radio frequency interface occurring in response to the radio frequency signal pulses transmitted by the transmitter, wherein said load changes are indicative of the presence of an external communication device; a first clock generator comprising a free-running oscillator, wherein said first clock generator is configured to provide a clock signal to the transmitter and the detection unit while said transmitter transmits said radio frequency signal pulses and the detection unit detects said load changes.

In one or more embodiments, the communication device further comprises a second clock generator including a crystal oscillator, wherein said second clock generator is configured to calibrate or recalibrate the first clock generator.

In one or more embodiments, the second clock generator is further configured to provide another clock signal to the transmitter after the communication device has entered into a regular communication mode.

In one or more embodiments, the communication device is configured to carry out, when operating in the regular communication mode, transactions with the external communication device.

In one or more embodiments, the communication device further comprises a controller configured to wake up one or more further components of the communication device in dependence on the load changes detected by the detection unit.

In one or more embodiments, the communication device further comprises a received signal strength indicator (RSSI) unit configured to output an RSSI value based on the load changes detected by the detection unit.

In one or more embodiments, the clock signal provided by the first clock generator has a frequency inaccuracy of at most 0.5%.

In one or more embodiments, the communication device further comprises a timer configured to trigger a wake-up of one or more components of the communication device at regular intervals.

In one or more embodiments, the communication device is at least one of a near field communication device, a radio frequency identification device and a proximity coupling device (PCD).

In one or more embodiments, a vehicle comprises a communication device of the kind set forth.

In accordance with a second aspect of the present disclosure, a method of operating a communication device is conceived, the communication device comprising a transmitter, detection unit and first clock generator, the first clock generator comprising a free-running oscillator, and the method comprising: transmitting, by the transmitter, one or more radio frequency signal pulses; detecting, by the detection unit, one or more load changes at a radio frequency interface occurring in response to the radio frequency signal pulses transmitted by the transmitter, wherein said load changes are indicative of the presence of an external communication device; providing, by the first clock generator, a clock signal to the transmitter and the detection unit while said transmitter transmits said radio frequency signal pulses and the detection unit detects said load changes.

In one or more embodiments, a second clock generator included in the communication device calibrates or recalibrates the first clock generator, said second clock generator comprising a crystal oscillator.

In one or more embodiments, the second clock generator provides another clock signal to the transmitter after the communication device has entered into a regular communication mode.

In one or more embodiments, the communication device carries out, when operating in the regular communication mode, transactions with the external communication device.

In one or more embodiments, a controller included in the communication device wakes up one or more further components of the communication device in dependence on the load changes detected by the detection unit.

DESCRIPTION OF DRAWINGS

Embodiments will be described in more detail with reference to the appended drawings.

DESCRIPTION OF EMBODIMENTS

As mentioned above, radio frequency (RF) communication devices are widely used. Examples of RF communication devices are near field communication (NFC) devices and radio frequency identification (RFID) devices. Typically, an NFC system or an RFID system includes a reader device—sometimes referred to as a reader, an interrogator or a proximity coupling device (PCD)—which generates a high-frequency radio field, and a passive or active communication counterpart. The communication counterpart may be a passive transponder or an active card emulation device, for example, which may be referred to as a proximity integrated circuit card (PICC). The reader device emits a radio frequency field that may power the communication counterpart. Modulation schemes and signal coding are applied for the communication between the devices. Specific implementation examples are described, inter alia, in the technical standards issued by the NFC Forum, and in the technical standards ISO/IEC 14443, ISO/IEC 15693, ISO/IEC 18092.

A primary device, i.e., a reader, should normally enable its RF field and poll for counterparts in all different communication technologies (such as NFC-A, NFC-B, NFC-F, NFC-V) to detect communication counterparts. Especially for battery-powered devices (e.g., vehicles, mobile devices, wearables, door lock readers) this is not efficient and reduces device availability due to power limitations. Therefore, a technique called Low Power Card Detection (LPCD), or Ultra-Low Power Card Detection (ULPCD) may be applied, which extends the battery lifetime by using short RF sense pulses to detect load changes at the RF interface of the reader. This allows the reader to reduce its RF field ON-duration and to switch to a power-saving state between the sense pulses (e.g., to enter a current-saving standby mode).

It is noted that Low Power Card Detection (LPCD) and Ultra-Low Power Card Detection (ULPCD) may also be referred to, in a more generic sense, as Lower Power Device Detection (LPDD) and Ultra-Low Power Device Detection (ULPDD), respectively. In other words, the low-power detection techniques as described herein may not only be applied to systems in which physical or virtual smart cards should be detected, for example, but also to systems in which other types of devices should be detected, for example radio frequency identification (RFID) tags or near field communication (NFC) tags.

Figure 1:
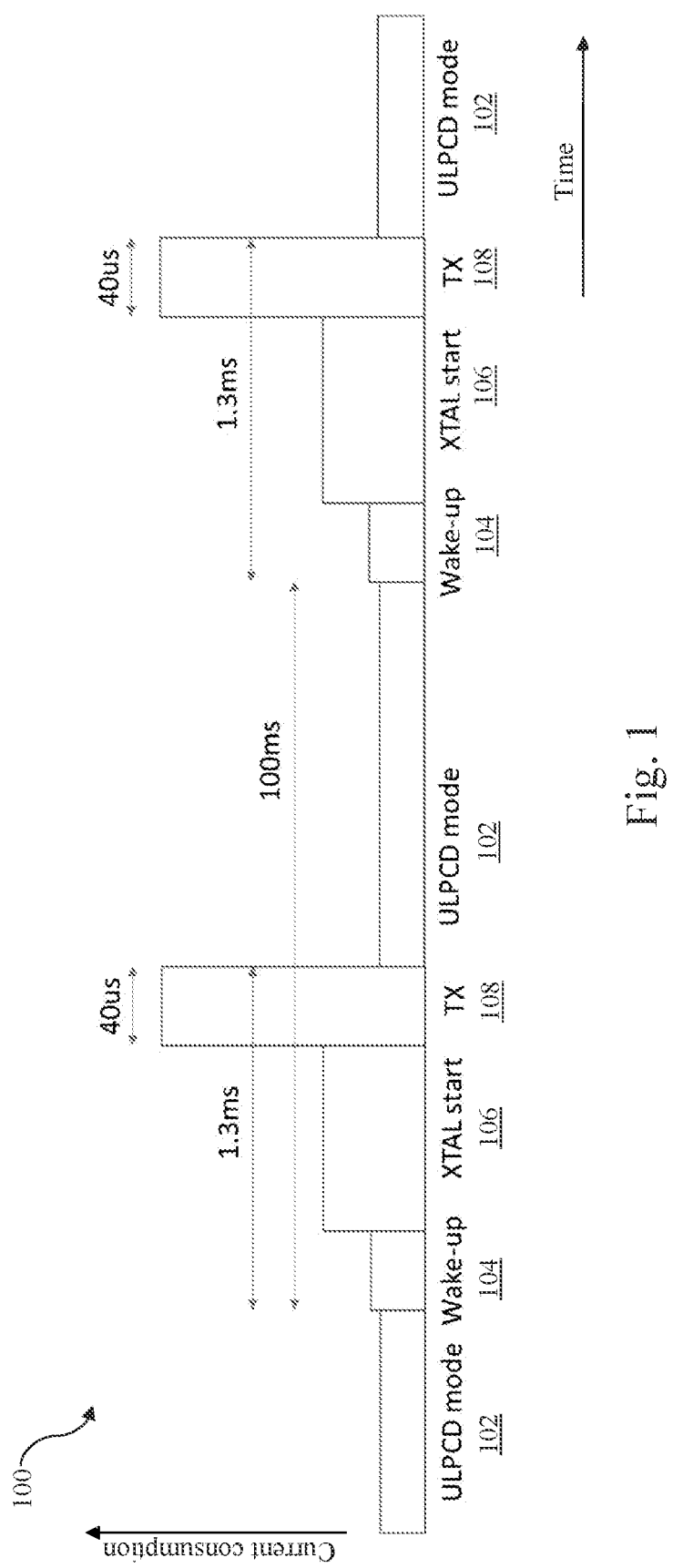
FIG. 1 shows an example of an a prior art ultra-low power card detection (ULPCD) sequence.

FIG. 1 shows an example of an ultra-low power card detection ULPCD sequence 100. The sequence 100 comprises the following phases: entering into the ULPCD mode 102, initiating a wake-up 104 of the components necessary to transmit the RF pulses and receive responses to said pulses, starting 106 a clock generator that includes a crystal oscillator (XTAL), and transmitting 108 the RF pulses. As shown in FIG. 1, these phases may be repeated, for example until an external communication device is detected and other components of the communication device are woken up to enable carrying out transactions with said external communication device.

Accordingly, communication devices such as NFC devices may support a so-called LPCD or ULPCD mode. In this mode the device is activated on a regular basis, for example every 300 ms, and is searching for the presence of a card (i.e., an external communication device) with the lowest possible current consumption. For smart access applications in the automotive area this feature is important, but the cycle time on one hand is reduced to 100 ms for latency reasons and the average current must be well below 100 µA in order to avoid draining a vehicle's battery when it is in a parking lot for a long time. FIG. 1 shows such a sequence in simplified form. In particular, it shows that the TX phase 108 has the largest current consumption (60% of the total current), but this cannot be changed as it depends on the application parameters. Furthermore, the XTAL start-up 106 consumes more than 20% of the total current.

Now discussed are a communication device and a corresponding method of operating a communication device, which facilitate reducing the power consumption of an LPCD or ULPCD sequence of the kind set forth. In other words, the presently disclosed communication device and operating method facilitate detecting an external communication device using a minimal amount of power.

Figure 2:
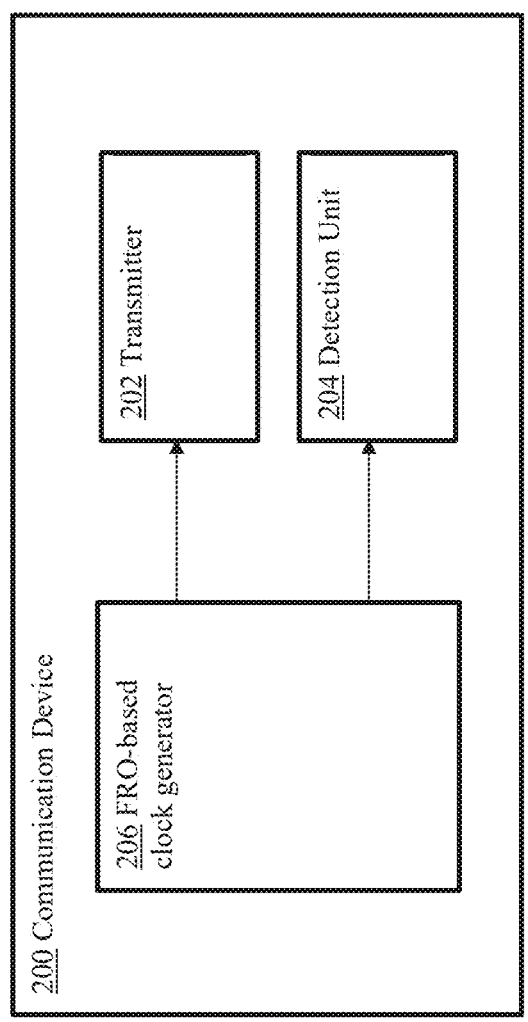
FIG. 2 shows an illustrative embodiment of a communication device.

FIG. 2 shows an illustrative embodiment of a communication device 200. The communication device 200 comprises a transmitter 202, a detection unit 204 and an FRO-based clock generator 206. The transmitter 202 is configured to transmit one or more radio frequency signal pulses. Furthermore, the detection unit 204 is configured to detect one or more load changes at a radio frequency interface occurring in response to the radio frequency signal pulses transmitted by the transmitter 202, wherein said load changes are indicative of the presence of an external communication device (not shown). Furthermore, the FRO-based clock generator 206 is configured to provide a clock signal to the transmitter 202 and the detection unit 204 while said transmitter 202 transmits said radio frequency signal pulses and the detection unit 204 detects said load changes. It is noted that the radio frequency interface may contain an antenna and a matching circuit, for example. By using a clock generator comprising a free-running oscillator (FRO) instead of a clock generator using a crystal oscillator (XTAL), the power consumption of the communication device 200 may be reduced when said device 200 operates in the LPCD or ULPCD mode.

In one or more embodiments, the communication device further comprises a second clock generator including a crystal oscillator, wherein said second clock generator is configured to calibrate or recalibrate the first clock generator. Thus, the first clock generator (i.e., FRO-based clock generator) is calibrated or recalibrated using a more accurate clock generator (i.e., a XTAL-based clock generator). In this way, the communication device may still reliably perform a LPCD or ULPCD operation, even if the first clock generator is relatively inaccurate. In one or more embodiments, the second clock generator is further configured to provide another clock signal to the transmitter after the communication device has entered into a regular communication mode. In this way, an accurate clock may be generated when the communication device operates in a regular communication mode, i.e., after the LPCD or ULPCD operation has detected an external communication device with which the communication device can communicate. It is noted that in that case also a receiver of the communication device may be activated, to enable receiving data signals from the external communication device. The clock signal generated by the second clock generator may also be provided to said receiver. In a practical implementation, the communication device is configured to carry out, when operating in the regular communication mode, transactions with the external communication device.

In one or more embodiments, the communication device further comprises a controller configured to wake up one or more further components of the communication device in dependence on the load changes detected by the detection unit. For example, these further components may include a XTAL-based clock generator and a more powerful receiver, which may be needed to carry out normal NFC communication. In this way, the communication device may have a suitable performance when it operates in a regular communication mode, in the sense that the relevant components have been activated. In one or more embodiments, the communication device further comprises a received signal strength indicator (RSSI) unit configured to output an RSSI value based on the load changes detected by the detection unit. By using a RSSI unit, the presence of an external communication device may easily be detected. In particular, the RSSI is a reliable metric to indicate the presence of the external communication device (i.e., a communication counterpart). Furthermore, in one or more embodiments, the clock signal provided by the first clock generator has a frequency inaccuracy of at most 0.5%. In this way, a relatively stable clock is generated for the LPCD or ULPCD operation, which facilitates achieving a reliable detection of an external communication device. It is noted that said inaccuracy may among others be caused by frequency drift. In one or more embodiments, the communication device further comprises a timer configured to trigger a wake-up of one or more components of the communication device at regular intervals. In this way, a continuous operation (either LPCD/ULPCD or regular communication) of the communication device may be ensured.

Figure 3:
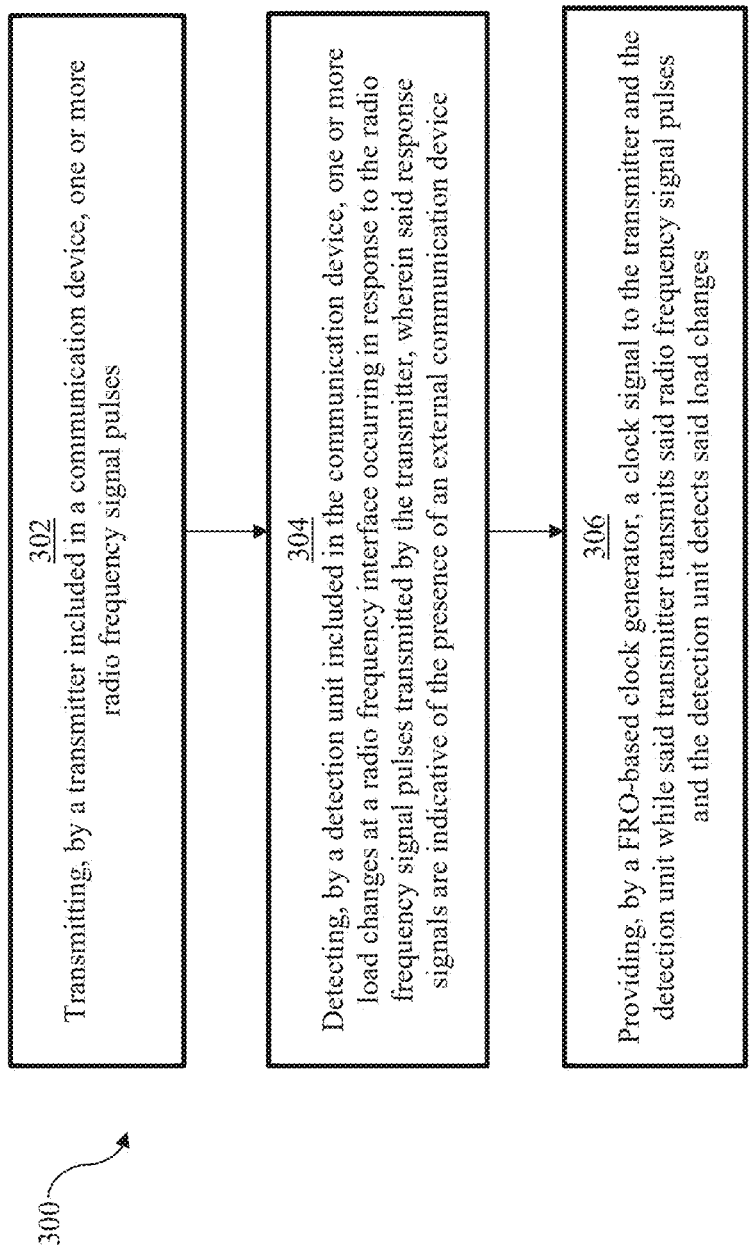
FIG. 3 shows an illustrative embodiment of a method of operating a communication device.

FIG. 3 shows an illustrative embodiment of a method 300 of operating a communication device. The method 300 comprises the following steps. At 302, a transmitter included in a communication device transmits one or more radio frequency signal pulses. At 304, a detection unit included in the communication device detects one or more load changes at a radio frequency interface occurring in response to the radio frequency signal pulses transmitted by the transmitter, wherein said load changes are indicative of the presence of an external communication device. Furthermore, at 306, a FRO-based clock generator provides a clock signal to the transmitter and the detection unit while said transmitter transmits said radio frequency signal pulses and the detection unit detects said load changes. As mentioned above, by using a clock generator comprising an FRO instead of a clock generator using an XTAL, the power consumption of the communication device may be reduced when said device operates in the LPCD or ULPCD mode.

Figure 4:
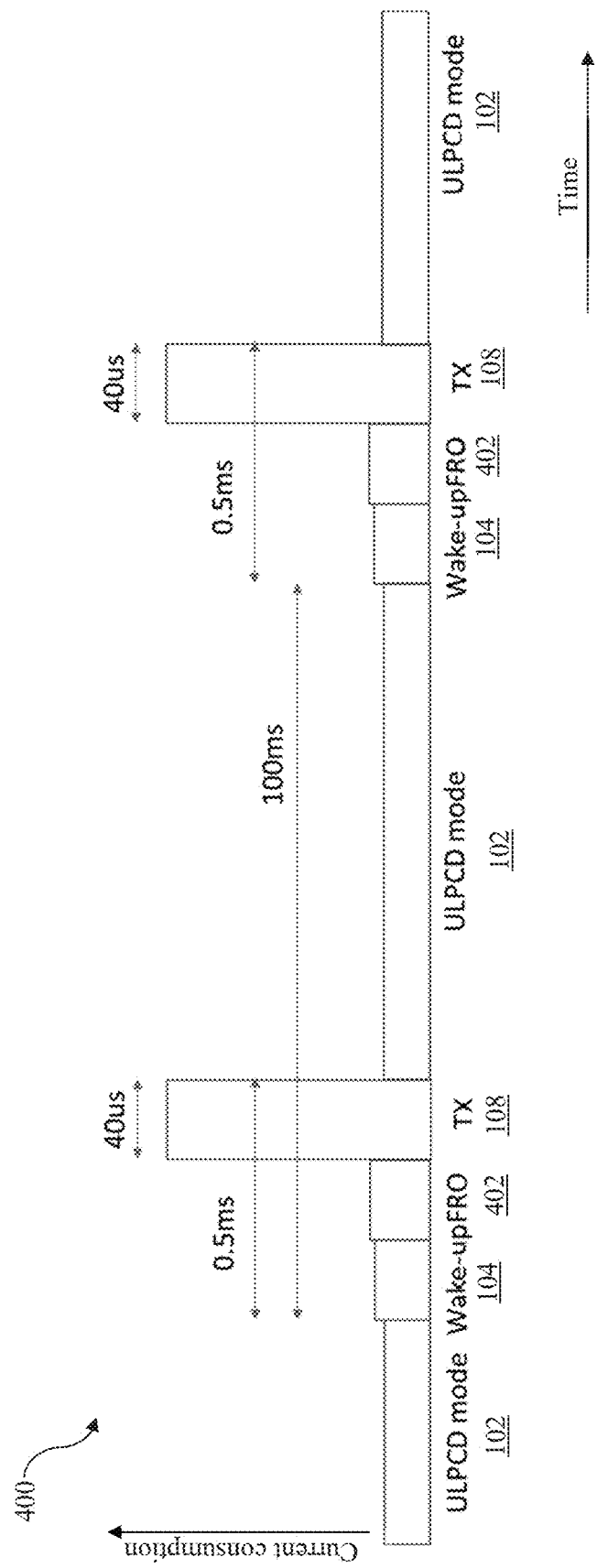
FIG. 4 shows an illustrative embodiment of a ULPCD sequence.

FIG. 4 shows an illustrative embodiment of a ULPCD sequence 400. The sequence 400 comprises the following phases: entering into the ULPCD mode 102, initiating a wake-up 104 of the components necessary to transmit the RF pulses and receive responses to said pulses, starting 402 a clock generator that includes a free-running oscillator, and transmitting 108 the RF pulses. As shown in FIG. 4, these phases may be repeated, for example until an external communication device is detected and other components of the communication device are woken up to enable carrying out transactions with said external communication device.

As shown in FIG. 4, the ULPCD sequence 400 is changed by using a FRO-based clock generator instead of an XTAL-based clock generator, which reduces the current consumption of the sequence. In particular, the XTAL is removed from the ULPCD sequence 400 and the transmitter may be operated only with a FRO. Furthermore, said FRO may have a small tolerance of for example 0.5% or less, to ensure that the detection of communication counterparts is still reliable. In addition, the FRO may be recalibrated at regular intervals, for example every time an NFC transaction is performed. This recalibration may be performed without additional hardware resources, because the XTAL-based clock generator is typically available for performing NFC transactions. It is noted that the term "NFC transaction" refers to any type of transaction that may be performed between two communication NFC devices, for example payment transactions, public transport ticket validations, building or room access applications, and vehicle access operations. Using the ULPCD sequence 400, the active current consumption may be reduced, and the on-time may become shorter, which in turn reduces the average current consumption.

Figure 5:
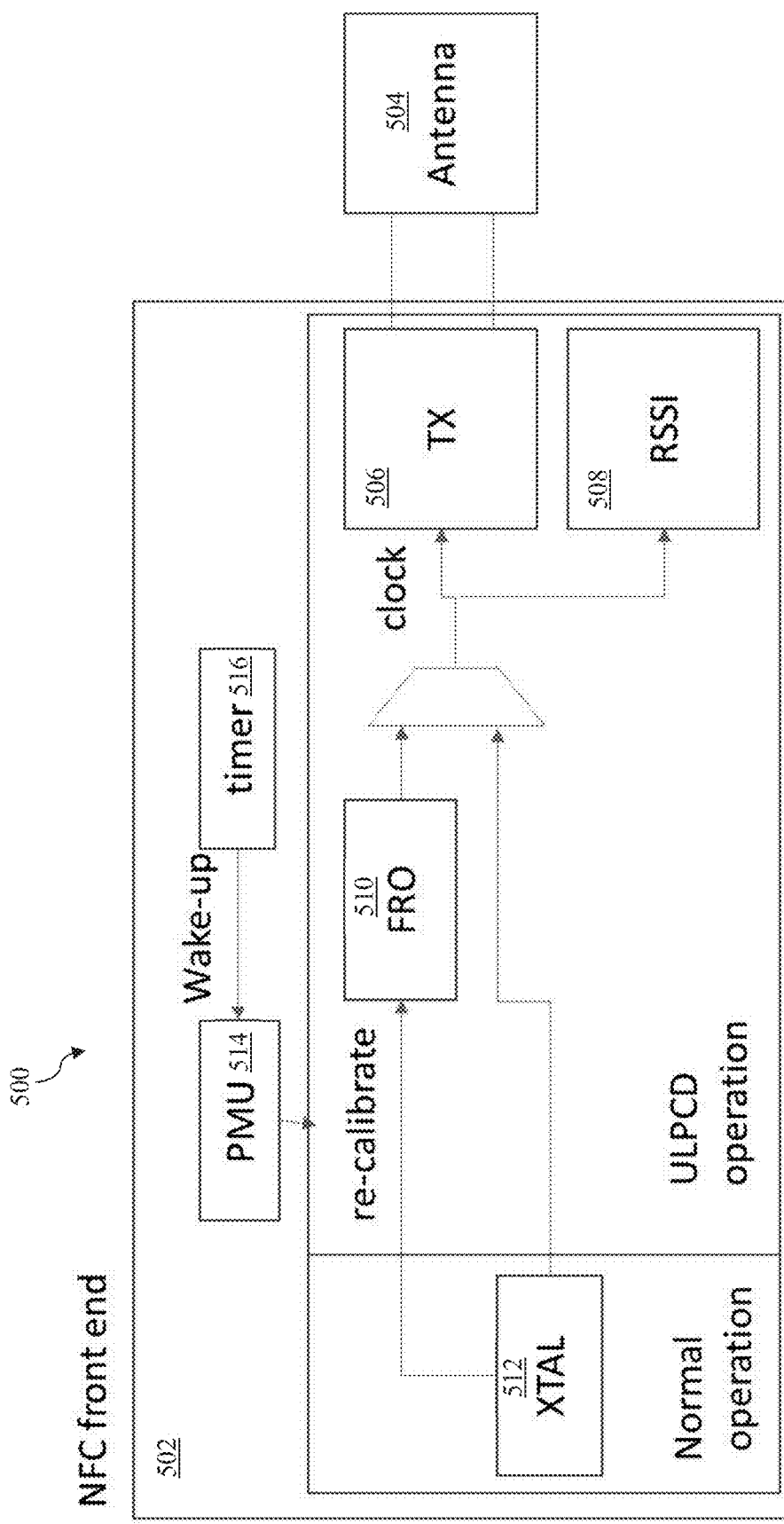
FIG. 5 shows an illustrative embodiment of a near field communication (NFC) device.

FIG. 5 shows an illustrative embodiment of a near field communication (NFC) device 500. The NFC device 500 comprises an NFC front-end module 502 and an antenna 504. The NFC front-end module 502 includes a transmitter 506 operatively coupled to said antenna 504, by means of which RF pulses may be transmitted to detect load changes at the antenna 504 when the NFC device 500 operates in the ULPCD mode. Furthermore, the transmitter 506 may transmit data signals to an external communication device (not shown) after the NFC device 500 has entered into a regular communication mode (i.e., into normal operation). Accordingly, the term "regular communication mode" refers to a mode of operation in which data signals can be exchanged between the NFC device 500 and the external communication device. When the NFC device 500 operates in the ULPCD mode, a free-running oscillator 510 is used to provide a clock signal to the transmitter 506. In contrast, when the NFC device 500 operates in the regular communication mode, a crystal oscillator 512 is used to provide a clock signal to the transmitter 506. Furthermore, the crystal oscillator 512 may be used to recalibrate the free-running oscillator 510 at regular intervals. When the NFC device 500 operates in the ULPCD mode, an RSSI unit 508 may be used to facilitate the detection of the external communication device. This RSSI unit 508 may also receive the clock signal generated by means of the free-running oscillator 510. Thus, during a ULPCD operation the transmitter 506 and RSSI unit 508 may be operated using the FRO-generated clock, while in normal operation the XTAL 512 may be used to supply the clock to the transmitter 506 and also to recalibrate the FRO 510 such that said FRO 510 remains sufficiently accurate. A power management unit 514 may be used to provide power to the components of the NFC front-end module 502. Said power management unit 514 may receive a wake-up signal from a timer 516 at regular intervals (e.g., every 100 ms), which triggers the power management unit 514 to provide power to said components. In other words, the timer 516 may be used to facilitate that the components of the NFC front-end module 502 are regularly reactivated, such that the ULPCD operations and normal operations can be performed.

Figure 6:
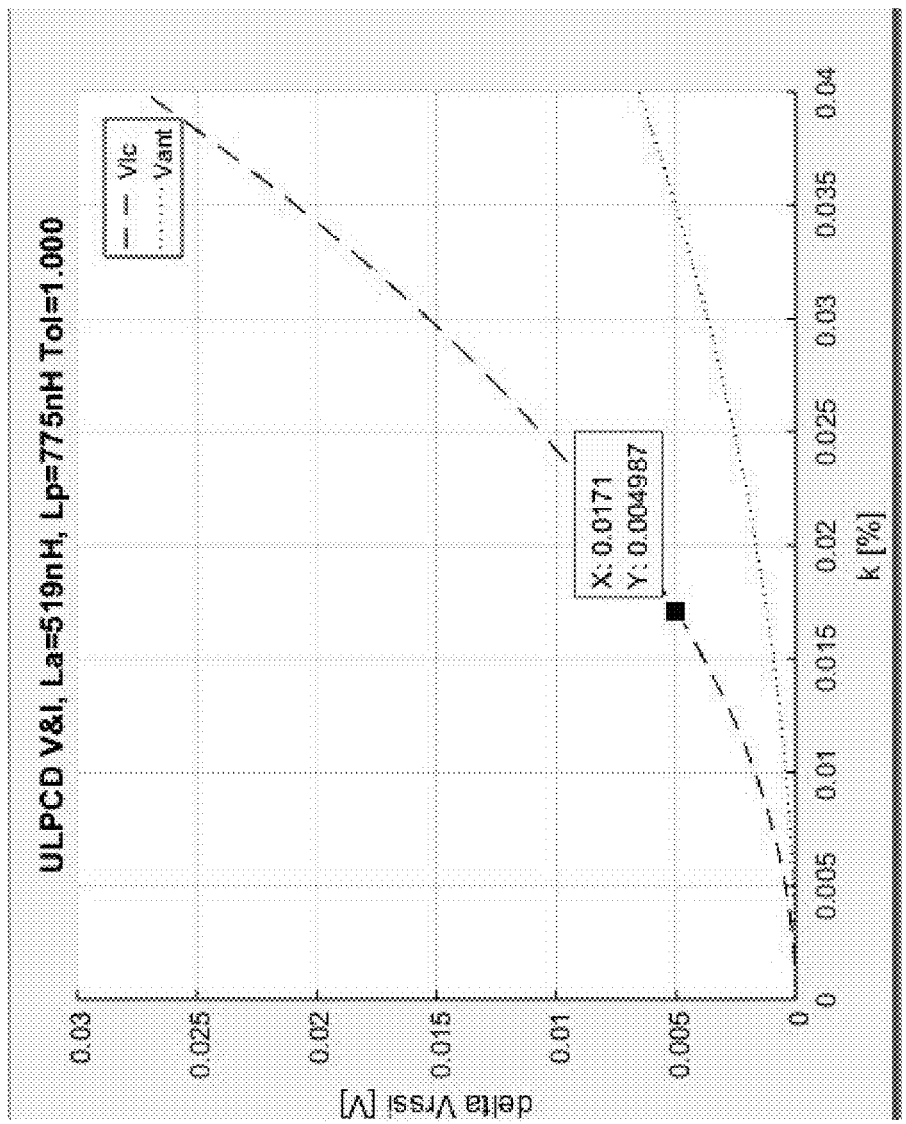
FIG. 6 shows the relationship between voltage and coupling factor for an accurate clock.
Figure 7:
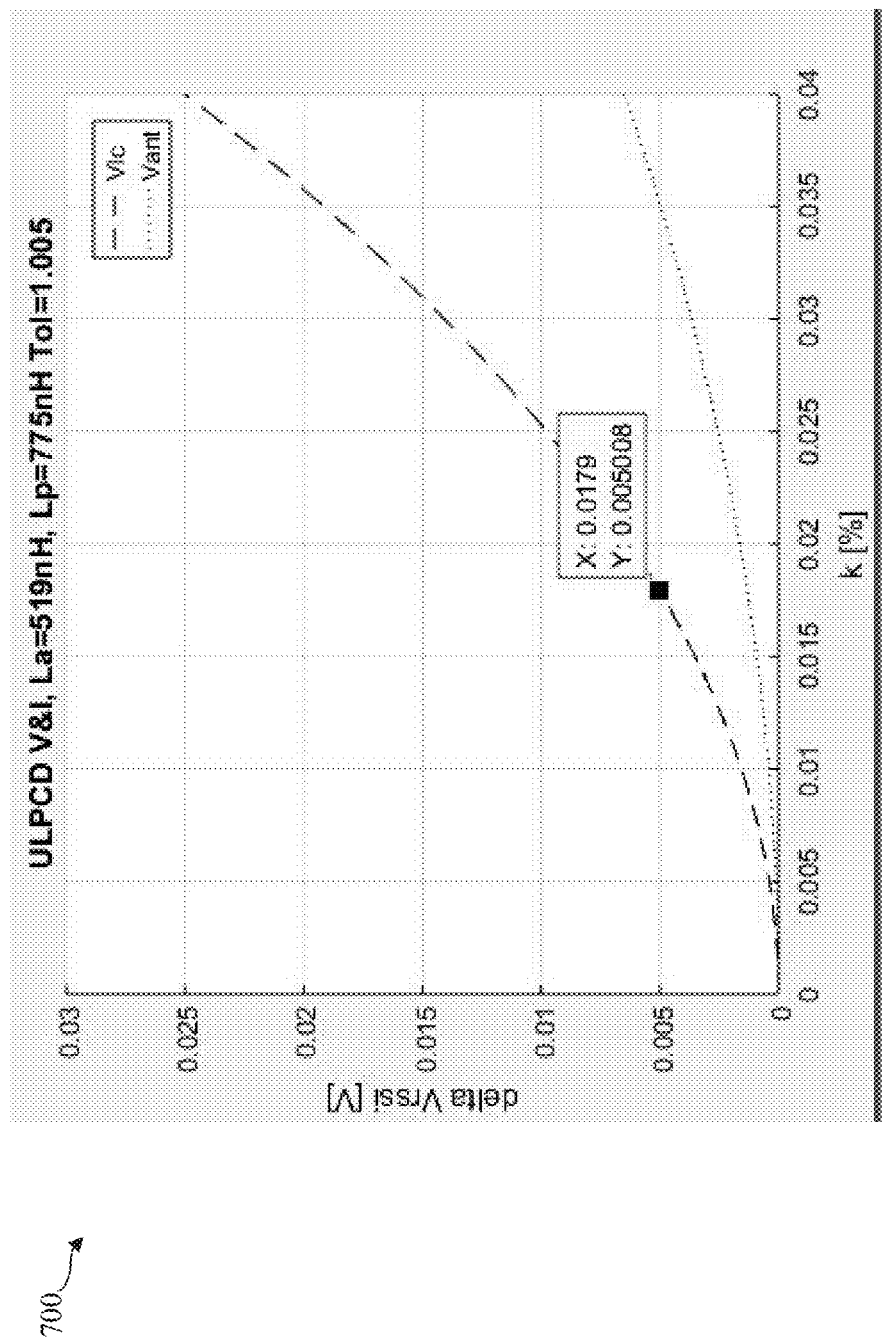
FIG. 7 shows the relationship between voltage and coupling factor for a less accurate clock.

FIGS. 6 and 7 shows the relationship between voltage and coupling factor for an accurate clock and a less accurate clock, respectively. In order to facilitate achieving a reliable detection of an external communication device, a maximum tolerance may be defined for the FRO. It is noted that the frequency of a FRO-based clock may have a higher inaccuracy than the frequency of an XTAL-based clock, but by applying a maximum tolerance the FRO-based clock may still be sufficiently accurate. FIG. 6 shows that a tolerance of 0% results in a 5 mVp voltage change at a coupling factor of 1.7%. FIG. 7 shows that, using the same setup, applying a tolerance of 0.5% requires a slightly stronger coupling of 1.75% to wake up the device. Thus, when a tolerance of 0.5% is applied the detection of the external communication device may still be sufficiently reliable. More specifically, in FIGS. 6 and 7 La and Lp refer to the antenna inductances of communicating devices. More specifically, La refers to the reader antenna inductance, while Lp refers to the antenna inductance of a listener or a card. Furthermore. Tol refers to the clock tolerance. FIG. 6 shows the result when an accurate XTAL-clock is used, while FIG. 7 shows the result when a clock is used having a deviation of +0.05%. Furthermore, Vlc refers to the voltage at the antenna matching circuit (specifically at the LC filter) and Vant refers the voltage at the antenna coupled to the matching circuit. It is shown that the delta RSSI voltage is larger at Vlc compared to Vant, so that it is beneficial to use Vlc for the ULPCD wake-up because the signal is stronger. On the Y-axis, the delta RSSI measurement is shown. In this example, the ULPCD operation performs a reference measurement and then performs another measurement every 100 ms; when the difference between the initial and the actual measurement is larger than a predefined threshold (e.g., 5 mV) the device will wake up.

The skilled person will appreciate that a FRO may be implemented in such a way that it is relatively stable, which may be advantageous in specific applications. For example, when an NFC device is embedded in a vehicle and used for enabling access to the vehicle, it may remain deactivated for prolonged periods of time, because the vehicle may be parked. In that case, a stable RFO may facilitate achieving a reliable performance while still enabling a reduction of the power consumption. It is noted that FRO stability refers to the ability of the FRO to maintain its output frequency. The output frequency typically varies as function of supply voltage, temperature and aging. A high stability means a small output frequency variation resulting from the aforementioned environmental conditions. The FRO according to the present disclosure may contain temperature compensation and may be made insensitive to supply voltage variations. In addition, the FRO may include initial trimming to remove frequency variations resulting from (variations in) the manufacturing process. This may ensure an output frequency close to the target frequency when the FRO is operated without a reference clock, in particular without the XTAL clock.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 ULPCD sequence
102 ULPCD mode
104 wake-up
106 crystal oscillator (XTAL) start
108 transmission
200 communication device
202 transmitter
204 receiver
206 FRO-based clock generator
300 method of operating a communication device
302 transmitting, by a transmitter included in a communication device, one or more radio frequency signal pulses
304 detecting, by a detection unit included in the communication device, one or more load changes at a radio frequency interface occurring in response to the radio frequency signal pulses transmitted by the transmitter, wherein said response signals are indicative of the presence of an external communication device
306 providing, by a FRO-based clock generator, a clock signal to the transmitter and the detection unit while said transmitter transmits said radio frequency signal pulses and the detection unit detects said load changes
400 ULPCD sequence
402 free-running oscillator (FRO) start
500 near field communication (NFC) device
502 NFC front-end
504 antenna
506 transmitter
508 received signal strength indicator (RSSI) unit
510 free-running oscillator
512 crystal oscillator
514 power management unit (PMU)
516 timer
600 voltage versus coupling factor for accurate clock
700 voltage versus coupling factor for less accurate clock

The invention claimed is:

1. A communication device, comprising:
a transmitter configured to transmit one or more radio frequency signal pulses;

a detection unit configured to detect one or more load changes at a radio frequency interface occurring in response to the radio frequency signal pulses transmitted by the transmitter, wherein said load changes are indicative of the presence of an external communication device;

a first clock generator comprising a free-running oscillator, wherein said first clock generator is configured to provide a clock signal to the transmitter and the detection unit while said transmitter transmits said radio frequency signal pulses and the detection unit detects said load changes.

2. The communication device of claim 1, further comprising a second clock generator including a crystal oscillator, wherein said second clock generator is configured to calibrate or recalibrate the first clock generator.

3. The communication device of claim 2, wherein the second clock generator is further configured to provide another clock signal to the transmitter after the communication device has entered into a regular communication mode.

4. The communication device of claim 3, being configured to carry out, when operating in the regular communication mode, transactions with the external communication device.

5. The communication device of claim 2, further comprising a controller configured to wake up one or more further components of the communication device in dependence on the load changes detected by the detection unit.

6. The communication device of claim 2, further comprising a received signal strength indicator, RSSI, unit configured to output an RSSI value based on the load changes detected by the detection unit.

7. The communication device of claim 2, wherein the clock signal provided by the first clock generator has a frequency inaccuracy of at most 0.5%.

8. The communication device of claim 2, further comprising a timer configured to trigger a wake-up of one or more components of the communication device at regular intervals.

9. The communication device of claim 2, being a near field communication device, a radio frequency identification device, and a proximity coupling device, PCD.

10. The communication device of claim 1, further comprising a controller configured to wake up one or more further components of the communication device in dependence on the load changes detected by the detection unit.

11. The communication device of claim 1, further comprising a received signal strength indicator, RSSI, unit configured to output an RSSI value based on the load changes detected by the detection unit.

12. The communication device of claim 1, wherein the clock signal provided by the first clock generator has a frequency inaccuracy of at most 0.5%.

13. The communication device of claim 1, further comprising a timer configured to trigger a wake-up of one or more components of the communication device at regular intervals.

14. The communication device of claim 1, being a near field communication device, a radio frequency identification device, and a proximity coupling device, PCD.

15. A vehicle comprising the communication device of 1.

16. A method of operating a communication device, the communication device comprising a transmitter, detection unit and first clock generator, the first clock generator comprising a free-running oscillator, and the method comprising:

transmitting, by the transmitter, one or more radio frequency signal pulses;

detecting, by the detection unit, one or more load changes at a radio frequency interface occurring in response to the radio frequency signal pulses transmitted by the transmitter, wherein said load changes are indicative of the presence of an external communication device;

providing, by the first clock generator, a clock signal to the transmitter and the detection unit while said transmitter transmits said radio frequency signal pulses and the detection unit detects said load changes.

17. The method of claim 16, wherein a second clock generator included in the communication device calibrates or recalibrates the first clock generator, said second clock generator comprising a crystal oscillator.

18. The method of claim 17, wherein the second clock generator provides another clock signal to the transmitter after the communication device has entered into a regular communication mode.

19. The method of claim 18, wherein the communication device carries out, when operating in the regular communication mode, transactions with the external communication device.

20. The method of claim 16, wherein a controller included in the communication device wakes up one or more further components of the communication device in dependence on the load changes detected by the detection unit.

* * * * *